US United States Patent [19] [11] 3,951,638
Bradley [45] Apr. 20, 1976

[54] PRILLING
[75] Inventor: John Kenneth Bradley, Ipswich, England
[73] Assignee: Fisons Limited, London, England
[22] Filed: June 26, 1975
[21] Appl. No.: 590,552

[30] Foreign Application Priority Data
July 6, 1974 United Kingdom............. 30043/74

[52] U.S. Cl.......................................... 71/11; 71/28; 71/64 DB; 264/7; 264/14
[51] Int. Cl.² ........................................... C05C 9/00
[58] Field of Search......... 71/28, 52, 11, 62, 64 DB; 252/88, 174; 260/555 C; 264/7, 13, 14, DIG. 51; 423/274, 275

[56] References Cited
UNITED STATES PATENTS
3,290,158   12/1966   Treat ...................................... 71/62
3,322,827   5/1967    James .............................. 260/555 C
3,457,336   7/1969    Harris .................................... 264/14
3,533,776   10/1970   Coates .................................... 264/7
3,622,575   11/1971   Ellul et al. ......................... 71/64 DB
3,717,451   2/1973    Severns et al. .................... 71/64 DB Primary Examiner—Charles N. Hart
Assistant Examiner—Ernest G. Therkorn
Attorney, Agent, or Firm—Wenderoth, Lind & Ponack

[57] ABSTRACT

Molten materials, notably molten fertilizers, are prilled into a tower up which flows a gas stream carrying or suspending dust particles some or all of which have been treated with a silicone. The silicone treatment reduces the amount of dust which is picked up by the molten material.

9 Claims, No Drawings

PRILLING

The present invention relates to a prilling process.

It has been proposed to prill molten materials into a dust zone, thus cushioning the fall of the drops of molten material and enabling one to use shorter prilling towers. This technique also coats the drops with powder from the dust zone and this may be used to achieve conditioning, e.g. anti-caking, of the prills. However, the pick-up of dust by the drops as they pass through the dust zone is often excessive and can not be reduced to acceptable levels.

We have now found that the pick-up of dust may be reduced by treating part or all of the dust with an organo silicon compound. Variation of the extent of the treatment of the dust offers a convenient means of controlling the dust pick-up, even with molten materials, such as urea, where the amount of dust picked-up is large. Moreover, we have found that with organo silicon treated particles, it is possible to achieve a higher dust loading (i.e. kg/m$^3$) in a gas flowing at a given linear flow rate than where untreated particles are used. It may thus be possible to achieve the same results using a yet shorter prilling tower, or to operate in the same height of tower but with a lower gas flow rate; in the first case saving on capital expenditure and in the second on running costs.

Accordingly, the present invention provides a process for producing prills which comprises allowing drops of a molten material to fall through a dust zone containing dust particles which have been treated with an organo silicon compound.

The process of the invention is of use in preparing prills from a wide variety of materials, for example from molten fertilizer materials, e.g. ammonium nitrate, ammonium sulphate-nitrate, ammonium phosphates, potassium phosphates, potassium nitrate, sodium nitrate, urea and mixtures of these either with themselves or with other materials. The invention is of especial use in the prilling of urea. Other molten materials may also be treated, e.g. sodium or potassium hydroxides, potassium chloride or sulphur.

The dusts into which the molten materials are prilled may be selected from a wide range of materials and may include mixtures of materials. We prefer, notably, when using mixtures of dusts, that at least part of the dust is such that in its untreated state it is wet by the molten material to be prilled into it, i.e. there should be a contact angle of less than 90° between the dust and the molten material, so that the dust may be picked up by the molten material. It may also be desirable that the dust should have an affinity for water, in order that it may impart anti-caking properties to the product prill. Furthermore, the dust should clearly be a material which is thermally stable under the prilling conditions. However, it is not necessary that the dust be inert to the molten material and it is possible to use dusts which react with the molten materials to form products which are wet by the molten material and which it is desirable to incorporate into the prill. Thus, ammonium nitrate may be prilled into a dust zone containing magnesium oxide or magnesium carbonate which react with the ammonium nitrate to produce magnesium nitrate which is readily wet by the ammonium nitrate and imparts thermal stability and anti-caking properties to the product prill.

Examples of suitable dusts for present use include aluminium, calcium or magnesium salts or compounds, such as the nitrates, carbonates, sulphates, or oxides thereof; talc; fullers' earth; montmorillonites which are desirably low in calcite; attapulgite clays; china clay; ball clay; phosphate rock; fertilizer materials, e.g. potassium metaphosphate, potassium chloride, potassium sulphate, ammonium sulphates and ammonium phosphates; organic polymers, e.g. powdered polyethylene; and the material being prilled.

The dust particles are desirably of a size less than 100 micrometers, preferably less than 50 micrometers.

The organo silicon compounds for present use include, for example, halosilanes, e.g. methyltrichlorosilane; and polysiloxane resins, which may be oils or solids. Suitable polysiloxanes include mono- or di- alkyl, alkoxy, aryl or aryloxy siloxanes or mixed siloxanes carrying aryl and alkyl groups or different alkyl groups. Preferably the alkyl groups contain from 1 to 6 carbon atoms. Specific examples of suitable polysiloxanes include a methylhydrogenpolysiloxane, dimethylpolysiloxane, phenylmethylpolysiloxane or dibutylpolysiloxane. Methylpolysiloxane is especially suitable. If desired final curing of the polysiloxane may take place in situ on the treated particles.

The treatment of the powder particles with the organo silicon compound may be carried out in any suitable manner, but is preferably carried out before the particles enter the dust zone; for example by spraying a solution, emulsion or suspension of the compound in a solvent, e.g. xylene or a chlorinated hydrocarbon, onto the particles tumbling in a rotating pan or in a fluidised bed or into a mill in which the material is being ground to the desired size for present use. Many treated powders suitable for present use are commercially available materials.

The amount of organo silicon compound on the treated powder particles may be varied to suit the desired pick-up of powder which is required by any given case. Whilst we prefer to treat all the powder which is to be used with from 0.1 to about 5% by weight of the organo silicon compound, preferably from 0.5 to 1%, it will be appreciated that it is also feasible to treat powder with a fixed amount of organo silicon compound, say 2%, and then blend this treated powder with an appropriate quantity of untreated powder to achive the desired overall organo silicon compound content for any given case. Indeed the use of a blend of treated and untreated particles may achieve a greater reduction in dust pick up than the use of uniformly treated particles.

In carrying out the process of the invention, the molten droplets are prilled, e.g. by means of a spinning basket prilling head or through a rainmaker type of prilling head, into a tower containing the dust sone. The dust zone is conveniently formed by means of a gas stream which flows up the tower, the dust particles being carried or suspended therein. Typically the loading of dust in the dust zone is from 0.1 to 5 kg of dust per cubic meter of gas. The gas flow rate up the tower is preferably from 0.1 to 1.2, e.g. 0.3 to 0.7, meters per second and the dust zone extends for at least 1 meter. Whilst nitrogen, carbon dioxide or other inert gas may be used to form the dust zone, the use of air is preferred.

In a particularly preferred manner of operating the prilling tower, a fluidised bed of particles, e.g. 15 to 200 cms, notably 40 to 120 cms deep, is formed below the dust phase. This fluidised bed serves as a cushion into which the dust coated but incompletely solidified droplets fall and as a cooling bed in which the droplets are further cooled. The fluidised bed may therefore be formed from any of the materials specified above for use in the dust phase, although the dust phase and fluidised bed materials need not be the same; or may be formed from solidified droplets. Conveniently, the fluidised bed is formed by feeding a single powder to the prilling tower, which powder contains particles of sizes varying from, say, less than 10 micrometers to 200 micrometers or more. In the tower the powder segregates in the gas stream to form a lower fluidised bed zone and an upper dust zone.

The fluidised bed may be formed using a separate gas stream from that used to form the dust phase in which case a slower gas flow rate is used for the fluidised bed than for the dust phase, e.g. 6 to 60 cms/second.

The invention will now be illustrated in the following Examples in which all parts and percentages are given by weight unless otherwise stated:

EXAMPLE 1

Molten material at just above its melting point was prilled down a column 2 meters high and 7.5 cms diameter up which air was blown at 200 liters/minute. Initially a charge of 800 gms of a silicone treated powder having particles all less than 100 micrometers in size was placed in the tower. Under the influence of the air stream there formed a denser fluidised bed zone 0.7 meters deep in the base of the tower and a leaner dust phase in the space above. Dust which was swept out of the tower was recovered and recycled with make-up dust to maintain the dust loading in the tower. The results for prilling operations using a number of dusts and molten materials are set out below:

| Dust | Amount of organo Silicon compound | Molten Material | Water content of molten material | temperature of molten material | Dust pick-up |
|---|---|---|---|---|---|
| Talc | — | Urea | 0.2% | 132°C | 9.0% |
| Talc | 1% of silicone A | Urea | 0.2% | 132°C | 3.8% |
| Talc | 0.5% of silicone B | Urea | 0.2% | 132°C | 2.1% |
| Talc | 1.0% of silicon B | Urea | 0.2% | 132°C | 1.9% |
| Fuller's earth | — | Ammonium nitrate | 0.4% | 174°C | 9.4% |
| Fuller's earth | 1% of silicone C | Ammonium nitrate | 0.2% | 174°C | 5.9% |
| Fuller's earth | — | Ammonium nitrate | 0.3% | 170°C | 5.7% |
| Fuller's earth | 1% of silicone C | Ammonium nitrate | 0.2% | 170°C | 2.0% |

Silicones A and B are methylphenylpolysiloxane resins and silicone C is a methylpolysiloxane which has been partially methoxylated and which contains a curing catalyst. The silicone treated powders were obtained by spraying a solution of the silicone in xylene and white spirit onto a tumbling bed of the particles.

EXAMPLE 2

The process of Example 1 was repeated using ranges of silicone C applied to different dusts. The results are set out below:

| Dust | Amount of organo Silicon compound | Molten Material | Water content of molten material | temperature of molten material | Dust pick-up |
|---|---|---|---|---|---|
| Talc | — | Urea | 0.1% | 133°C | 30% |
| Talc | 1% | Urea | 0.2% | 133°C | 2% |
| Fuller's earth | — | Urea | 0.7% | 133°C | 30% |
| Fuller's earth | 1% | Urea | 0.6% | 133°C | 20% |
| Fuller's earth | 2.5% | Urea | 0.4% | 133°C | 5% |
| Ball Clay | 2.5% | Urea | 0.2% | 133°C | 1% |
| Talc | 0.3% | Urea | 0.1% | 134°C | 2.5% |

EXAMPLE 3

Molten ammonium nitrate at 174°C was prilled down a column 5 meters high and 0.6 meters in diameter up which air was flowing at 0.5 meters per second. Initially a charge of 150 kgs of fuller's earth with a particle size 100% less than 70 micrometers was placed in the tower. The fuller's earth was composed of a mixture of varying proportions of treated and untreated dust as set out below. Under the influence of the air stream, the particles formed a fluidised bed zone approximately 1.2 meters deep in the base of the tower and an upper lean dust phase (dust loading approximately 0.3 kgs/m$^3$) in the space above. Dust was recovered from the exit gases and recycled with make-up dust to maintain the dust loading in the tower.

Prilling runs were carried out with varying proportions of untreated fuller's earth and fuller's earth which had been coated with silicone C as in Example 1 to provide 1.5% w/w of silicone on the treated particles. The results of these tests are summarised below:

| Dust Composition | | Dust picked |
| % untreated | % treated | up by prills |
|---|---|---|
| 100 | — | 6% |
| — | 100 | 0.8% |
| 75 | 25 | 1.5% |
| 87.5 | 12.5 | 2.5% |

EXAMPLE 4

The prilling process of Example 3 was repeated except that in this case the dust was either treated or all untreated and the air flow rate up the tower was varied to determine the lowest rate at which satisfactory fluidisation of the bed of particles and satisfactory prill formation took place. The results are summarised below:

| Dust | Air flow rate | Comments |
|---|---|---|
| Untreated | 0.3 m/sec | Inadequate fluidisation and product misshapen |
| | 0.6 m/sec | Adequate fluidisation product quality acceptable |
| Treated with 0.5% w/w of silicone C | 0.1 m/sec | Adequate fluidisation and product quality acceptable |

These results clearly demonstrate that by treating the dust particles with a silicone one can operate the prilling process with a lower gas flow rate up the tower. It was also noted that the dust loading (as evidenced by the pressure drop across the bag filters used to recover dust from the exit gases) in the gas stream was higher (by a factor of approximately 2) in the case of the treated dust than in the case of untreated dust. This indicates that it would have been possible to reduce the height of the prilling tower and yet still produce an acceptable product.

I claim:

1. A process for producing prills which comprises allowing drops of a molten material to fall through a dust zone containing dust particles which have been treated with an organo silicon compound.

2. A process as claimed in claim 1 wherein an overall amount of from 0.1 to 5% by weight of the organo silicon compound has been applied to the dust particles.

3. A process as claimed in claim 1 wherein the dust particles comprise a mixture of particles which have been treated with an organo silicon compound and particles which have not been so treated.

4. A process as claimed in claim 1 wherein the particles are treated with the organo silicon compound before they enter the dust zone.

5. A process as claimed in claim 1 wherein the organo silicon compound is selected from a halosilane and a polysiloxane.

6. A process as claimed in claim 1 wherein the dust zone is formed above a fluidised bed of particles.

7. A process as claimed in claim 1 wherein the dust zone is formed by means of a gas stream which flows at from 0.1 to 1.2 meters per second up the tower, carrying or suspending from 0.1 to 5 kgs/m$^3$ of the dust particles therein.

8. A process for producing fertilizer prills which comprises forming a molten fertilizer material into droplets of molten material which fall down a tower up which a stream of air flows, which stream of air carries or suspends solid particles having a particle size of less than 100 micrometers, at least part of said particles having been given a surface treatment with an organosilicon compound selected from halosilanes, alkyl polysiloxanes, alkoxy polysiloxanes, aryl polysiloxanes, mixed alkyl-arylpolysiloxanes and mixtures thereof, so as to provide from 0.1 to 5% by weight of the organosilicon material on the treated particles; the gas stream flows up the tower at a velocity of from 0.1 to 1.2 meters per second and carries or suspends from 0.1 to 5 kgs/m$^3$ of solid particles therein.

9. A process as claimed in claim 8 wherein the dust particles are selected from the group consisting of aluminium, calcium or magnesium salts or compounds; talc; fuller's earth; montmorillonites; attapulgite clays; china clay; ball clay; phosphate rock; fertilizer materials; and the material being prilled.

* * * * *